No. 735,382. PATENTED AUG. 4, 1903.
W. C. HOWARD.
FRAME FOR HAND MIRRORS.
APPLICATION FILED SEPT. 13, 1902.
NO MODEL
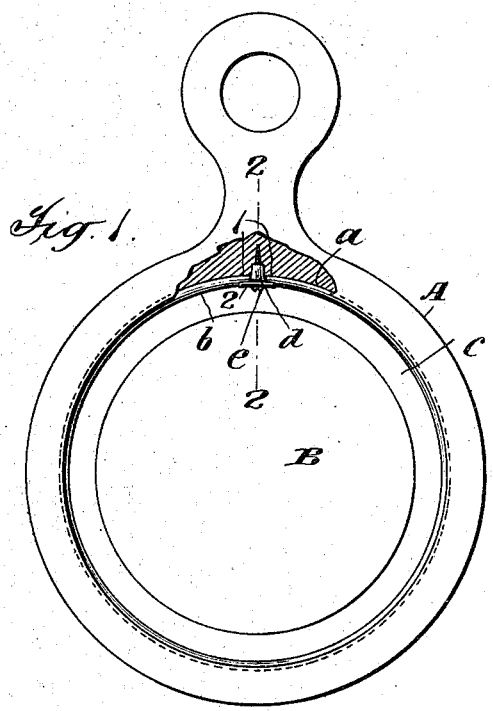
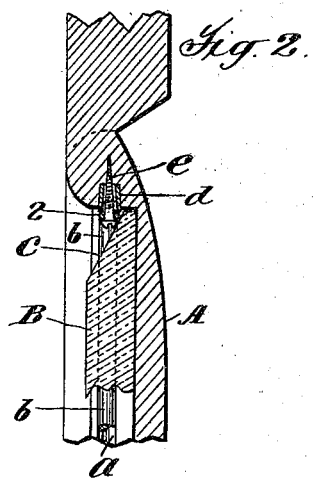
Attest:
W. H. Kennedy
J. A. Travis
Inventor:
William C. Howard
by Philipp Sawyer Rice & Kennedy
Attys No. 735,382. Patented August 4, 1903.

UNITED STATES PATENT OFFICE.

WILLIAM C. HOWARD, OF NEW YORK, N. Y.

FRAME FOR HAND-MIRRORS.

SPECIFICATION forming part of Letters Patent No. 735,382, dated August 4, 1903.

Application filed September 13, 1902. Serial No. 123,202. (No model.)

*To all whom it may concern:*

Be it known that I, WILLIAM C. HOWARD, a citizen of the United States, residing at New York, county of New York, and State of New York, have invented certain new and useful Improvements in Frames for Hand-Mirrors and other Articles, fully described and represented in the following specification and the accompanying drawings, forming a part of the same.

The especial object of the present invention is to provide improved means for holding the glass of a hand-mirror in its frame; but the invention is applicable also in connection with other articles held in annular frames.

The especial feature of the invention consists in a holding-reed of less length than its groove, with a removable piece which fills the space between the ends of the reed, so as to hold the reed against removal until the removable piece is taken out.

The invention will be described and illustrated in connection with a hand-mirror and the features forming the invention then specifically pointed out in the claims.

In the accompanying drawings, Figure 1 is a face view of a hand-mirror embodying the invention in one of its preferred forms with the frame partly broken away to show the construction. Fig. 2 is a section on the line 2 of Fig. 1.

Referring to said drawings, A is the frame, having the circular recess in its face for receiving the mirror B and provided with the groove $a$ in the edge of the frame encircling the recess. In this groove $a$ is the reed $b$, preferably of metal, but which may be of any suitable material, this reed overlapping the bevel edge $c$ of the glass, as shown clearly in Fig. 2, so as to hold the glass in position to permit it to be removed by taking out the reed $b$. The reed $b$ is of such length, as shown clearly in Fig. 1, that its ends 1 are a short distance apart when it is in position in the groove $a$, and the space between the reed ends 1 is filled by a removable piece, which consists in the form shown of a small sleeve or eyelet $d$, set loosely into a recess in the frame A and held in position by a screw $e$, passing through the eyelet into the frame A. If desired, the ends of the reed may be covered by a thin strip overlapping the ends. Such a strip 2 is shown in the drawings held in place by the screw $e$. The removable piece, however, may be of any other suitable form and construction adapted for insertion and removal between the ends of the reed, so as to lock or hold the latter against removal.

It will be seen that my invention provides a very simple, cheap, and efficient means of assuring the retention of the reed in place and preventing its accidental removal, as the reed cannot become displaced and allow the glass or article held thereby to be removed, without taking out the removable piece between its ends.

What I claim is—

1. The combination with an annular frame and its holding-groove, of a reed of less length than the groove, and a removable piece between the ends of the reed by which the ends of the reed are held separated, substantially as described.

2. In a hand-mirror or the like, the combination of the annular frame A having the groove $a$, the glass or similar article B, reed $b$ in said groove overlapping the glass or similar article B for holding it in place and having a space between its ends, and a removable piece between the ends of the reed by which the ends of the reed are held separated, substantially as described.

In testimony whereof I have hereunto set my hand in the presence of two subscribing witnesses.

WILLIAM C. HOWARD.

Witnesses:
W. H. KENNEDY,
J. A. GRAVES.